(12) United States Patent
Yu et al.

(10) Patent No.: US 10,467,386 B2
(45) Date of Patent: *Nov. 5, 2019

(54) SOFTWARE DEVELOPMENT AND DEPLOYMENT IN MULTIPLE ENVIRONMENTS

(71) Applicant: Alibaba.com Limited, George Town (KY)

(72) Inventors: Liujin Yu, Sunnyvale, CA (US); Gregory Charles McNutt, Sunnyvale, CA (US)

(73) Assignee: Alibaba.com Limited (KY)

( * ) Notice: Subject to any disclaimer, the term of this patent is extended or adjusted under 35 U.S.C. 154(b) by 412 days.

This patent is subject to a terminal disclaimer.

(21) Appl. No.: 15/360,746

(22) Filed: Nov. 23, 2016

(65) Prior Publication Data

US 2017/0140132 A1    May 18, 2017

Related U.S. Application Data

(63) Continuation of application No. 13/529,882, filed on Jun. 21, 2012, now Pat. No. 9,542,566.

(Continued)

(51) Int. Cl.
*G06F 21/12* (2013.01)
*G06F 21/62* (2013.01)
*G06F 8/71* (2018.01)

(52) U.S. Cl.
CPC ............... *G06F 21/12* (2013.01); *G06F 8/71* (2013.01); *G06F 21/6218* (2013.01); *G06F 2221/0704* (2013.01); *G06F 2221/2141* (2013.01)

(58) Field of Classification Search
CPC .......... G06F 21/12; G06F 8/71; G06F 21/6218
See application file for complete search history.

(56) References Cited

U.S. PATENT DOCUMENTS 7,793,343 B2    9/2010  Timmerman
7,886,038 B2    2/2011  Ferris
(Continued)

OTHER PUBLICATIONS

Huai et al. (ROST: Remote and hot service deployment with trustworthiness in CROWN Grid, Future Generation Computer Systems 23 (2007) 825-835) (Year: 2007).*

(Continued)

*Primary Examiner* — Oleg Korsak
(74) *Attorney, Agent, or Firm* — Van Pelt, Yi & James LLP (57) ABSTRACT

Developing, deploying, and operating an application in a plurality of environments is disclosed, including: defining runtime specific configuration information for a plurality of environments, wherein the runtime environment specific configuration includes topology configuration and security configuration, wherein the runtime environment specific configuration information is stored separately from other configuration information and is protected by an identity management system; executing an application in one of the plurality of environments, wherein execution of the application is controlled by a first role; and presenting a credential associated with the first role to the identity management system to obtain a portion of the runtime environment specific configuration information corresponding to the environment associated with the executing application.

17 Claims, 4 Drawing Sheets

Related U.S. Application Data (60) Provisional application No. 61/501,132, filed on Jun. 24, 2011.

(56) References Cited

U.S. PATENT DOCUMENTS

| | | |
|---|---|---|
| 7,996,883 B2 | 8/2011 | Chin |
| 8,418,238 B2 | 4/2013 | Platt |
| 2003/0009546 A1 | 1/2003 | Benfield |
| 2006/0117390 A1 | 6/2006 | Shrivastava |
| 2006/0200665 A1 | 9/2006 | Olson |
| 2010/0162383 A1 | 6/2010 | Linden |
| 2012/0124211 A1 | 5/2012 | Kampas |
| 2012/0185913 A1 | 7/2012 | Martinez |

OTHER PUBLICATIONS

"Secure Your Spring Application Configuration With Jasypt", Oct. 9, 2008, XP55042202, Retrieved from the Internet: URL: http://heurisficexcepfion.wordpress.com/2008/10/09/secure-your-spring-application-configuration-with-jasypt/ [retrieved on Oct. 25, 2012] p. 1-4.

"Protect embedded password", Sep. 19, 2008, XP55042071. Retrieved from the Internet: URL: http://stackoverflow.com/questions/102425/protect-embedded-password [retrieved on Oct. 24, 2012] the whole document.

\* cited by examiner

SOFTWARE DEVELOPMENT AND DEPLOYMENT IN MULTIPLE ENVIRONMENTS

CROSS REFERENCE TO OTHER APPLICATIONS

This application is a continuation of co-pending U.S. patent application Ser. No. 13/529,882 entitled DEVELOP AND DEPLOY SOFTWARE IN MULTIPLE ENVIRONMENTS filed Jun. 21, 2012, which claims priority to U.S. Provisional Patent Application No. 61/501,132 entitled DEVELOP AND DEPLOY SOFTWARE IN MULTIPLE ENVIRONMENTS filed Jun. 24, 2011 both of which are incorporated herein by reference for all purposes.

BACKGROUND OF THE INVENTION

In traditional development and deployment technologies, configuration information including security information was deployed to and persistently stored at systems on which one or more instances of one or more types of environments are to be run. Since these systems were potentially shared among different types of environments, users from the different environments may edit the source code of the configuration information that was shared, at least in part, among the different environments. However, problems arise when a user from a first type of environment edits the source code in a way that may detrimentally affect the configuration for a second type of environment.

Furthermore, writing a generic application that works for all environments is not easy. Some traditional approaches are error-prone. For example, one way is to edit "/etc/hosts" files to resolve hostname issues. This usually only works for advanced developers. An alternative approach is to put many if/else in the configuration information source code to differentiate the handling of different types of environment data. This approach creates a lot of code paths that will only execute in one type of environment, and makes testing/debugging in one type of environment (e.g., development) for issues from another type of environment (e.g., production) extremely difficult.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditional development and deployment technologies are often suited for use in statically configured environments. As used herein, an "environment" refers to one or more physical or virtual devices used to run a certain type of application. For example, a production environment is used to run a production type of application (e.g., application released to the customers), and a development environment is used to run a development type of application (e.g., application that is still being developed and not yet released to the customers). These traditional technologies, however, are often inadequate for managing and protecting configuration information effectively across multiple environments. Examples of configuration information include security information and topology information. Examples of environments include the development environment, the quality assurance (QA) environment, and the production environment. It is even more challenging to use the traditional technologies in dynamic environments, such as cloud based environments. Amazon Web Services® (AWS) is one example of a dynamic environment. Configuration information is often environment specific. For example, in the development environment, there is usually a single server with different applications/services that bind to different ports and so the localhost address is usually used (unlike the multiple virtual internet protocols (IPs) that are typically used in the production environment). In the QA environment, there is typically a single instance of the application running for testing purposes (unlike the multiple instances of the application that are typically used in the production environment). In the production environment, there are typically multiple virtual IPs (VIP) and multiple instances of the application.

A technique of developing, deploying, and operating an application in a plurality of environments is described herein. In various embodiments, configuration information to be used during runtime is defined for each of a plurality of environment types. For example, a set of configuration information specific to a development environment is defined, a set of configuration information specific a production environment is defined, and a set of configuration information specific to a QA environment is defined. Examples of a set of configuration information include security configuration and topology configuration. In some embodiments, the sets of environment specific configuration information is stored separately from other configuration information (e.g., web application data that may or may not be specific to different environments) and is also protected by an identity management system. In some embodiments, the sets of environment specific configuration information are stored in a central configuration information management system and/or remotely from the other configuration data. By storing the sets of environment specific configuration information in a central manner, the sets of configuration information may be easily located for updating or other purposes.

In various embodiments, the identity management system that protects the sets of environment specific configuration information may permit only a limited set of security roles to access and modify the sets of configuration information. For example, this limited set of security roles, such as a security manager role, may modify the configuration information at the central configuration management system. In various embodiments, the identity management system that protects the sets of environment specific configuration information may permit another set of security roles to access the sets of configuration information during, for example, runtime, but not to modify the configuration information. For example, this other set of security roles is associated with roles that are responsible with running instances of various environments, such as a production application manager, and may submit appropriate credentials to access the set of configuration information for which they have the required privilege level from the central configuration information management system when they wish to start an instance of a particular environment. For example, a security role associated with managing the production environment may have credentials to access the set of production environment specific configuration information but may not have the credentials to access the set of QA environment specific configuration information. In various embodiments, the security roles that may access and modify the sets of environment specific configuration information are different from the security roles that may only access the sets of environment specific configuration information. As such, leaks of security keys may be avoided by assigning different security roles among a team of users, a few of which may be assigned the role of a security manager who may modify the sets of environment specific configuration information, while the other users who are primarily involved with running the environments may be assigned environment specific manager roles that may only read the sets of configuration information associated with their respective environment.

Figure 1:
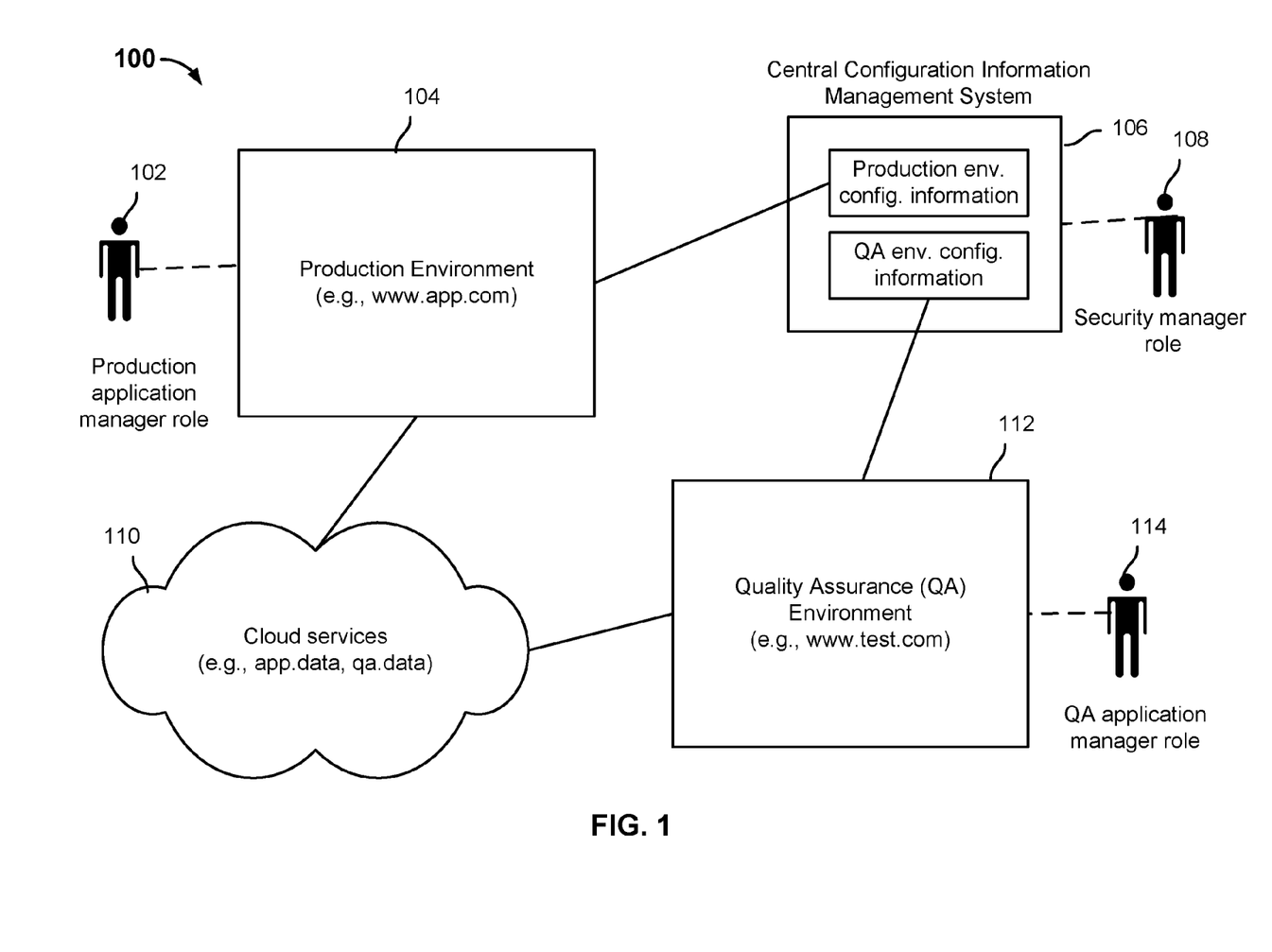
FIG. 1 is a diagram showing an embodiment of a system for developing, deploying, and operating an application in a plurality of environments.

FIG. 1 is a diagram showing an embodiment of a system for developing, deploying, and operating an application in a plurality of environments. In the example, system 100 is production environment 104, production application manager role 102, central configuration information management system 106, security manager role 108, cloud services 110, quality assurance (QA) environment 112, and QA application manager role 114. While the example shows only production environment 104 and QA environment 112, more or fewer types of environments may be included in a system such as system 100. In the example, each of production environment 104 and QA environment 112 is an instance of its respective type of environment. In the example, central configuration information management system 106 is protected by an identity management system (not shown in the example). In some embodiments, central configuration information management system 106 may be implemented using a repository such as Amazon Simple Storage Service® (Amazon S3). In some embodiments, the identity management system permits users associated with security manager role 108 to access and modify the sets of environment specific configuration information stored at central configuration information management system 106. As used herein, "user" may refer to a human operator or a machine operator (e.g., a computer program).

In some embodiments, the identity management system permits users associated with environment specific roles (e.g., production application manager role 102 and QA application manager role 114) to only access but not modify the sets of environment specific configuration information stored at central configuration information management system 106. One or more users may possess security manager role 108 by virtue of having the appropriate credentials, passwords, and/or other form of authentication for logging on as a security manager role. Users with security manager role 108 have the required privilege level to access the sets of environment specific configuration information, such as the set of production configuration information and the set of QA environment configuration information that are shown in the example, and to modify these sets of configuration information at this central location if desired. In some embodiments, each set of environment specific configuration information comprises one or more files. In various embodiments, each set of environment specific configuration information includes at least topology configuration and security configuration for that environment. As used herein, topology configuration refers to configurations used to access systems associated with the environment externally (e.g., http/https, VIP/hostname, port, etc.), and configurations used to access components in the deployment internally (such as static files, load balancers, remote services, database, log file location, etc.). For example, the topology configuration may comprise a script that determines which port each component used in an application runs on. For example, the following sample script may be used to form a URL for accessing certain configuration widget: <script type="text/javascript" src="https://share.vendio.${dns.subdomain}:${rockstar.web.https.port}/widget.js"></script>. Thus, the wildcard CNAME such as *.liujin.vendio.us maps to the developer box, and forms URLs for application components such as https://share.vendio.liujin.vendio.us:100/widget.js. In some embodiments, the set of environment specific configuration information for a particular type of environment may include alternative topology or security configurations to be used by different instances (applications) of the same environment. As used herein, security configuration refers to configurations used to access protected internal sources and/or protected third party application programming interfaces (APIs), such as secret keys and URLs used by third parties (e.g., Facebook®, Twitter®, Amazon AWS®, Bitly®, etc.). In various embodiments, users who do not have security manager role 108 cannot access central configuration information management system 106 to modify the sets of environment specific configuration information stored at central configuration information management system 106. In various embodiments, prior to runtime, copies of the sets of environment specific configuration information are not stored at locations other than central configuration information management system 106 and/or they are not stored with other configuration data (e.g., web application configuration). Then during runtime of one or more environments (e.g., when applications are to be instantiated in the one or more environments), the sets of environment specific configuration information are retrieved by system(s) associated with environments and stored locally (e.g., and temporarily) at the systems.

Production environment 104 is managed by users with production application manager role 102. For example, applications instantiated in production environment 104 may be implemented as Web Application Archive (WAR) files running inside standard one or more Java 2 Platform Enterprise Edition (J2EE) web containers. In this example, production environment 104 is accessible at an URL such as www.app.com (i.e., www.app.com is the external access point for that instance of production environment 104). Users with production application manager role 102 may instantiate an application in production environment 104. In various embodiments, users associated with production application manager role 102 have the required privilege level to perform read-only access to central configuration information management system 106 and the set of production environment configuration information (but not sets of configuration information specific to environments other than production) stored thereof. Users with production application manager role 102 (or any other environment specific application manager roles) are typically different from users with security manager role 108. So, users typically with production application manger role 102 are only permitted by the identity management system to read the set of production environment configuration information stored at central configuration information management system 106 but are not permitted to modify the set of configuration information as users with security manager role 108 can. When a user associated with production application manager role 102 wishes to instantiate an application in production environment 104 during runtime, the user may submit, over a network (e.g., the Internet), the appropriate credentials, password, and/or any other type of authentication to identify himself (or itself if the user is a machine operator) as having production application manager role 102 to the identity management system and in return, the identity management system will grant the user read-only access to central configuration information management system 106 to obtain the set of production environment configuration information. The set of production environment configuration information may include the security keys (e.g., passwords, credentials, authentication information) needed to access internal services or third party services such as cloud services 110 (e.g., which are accessed over a network), and/or topology configuration such as how the application is to access systems (e.g., load balancers, web servers) associated with production environment 104 externally that are needed to enable the application to run properly. For example, cloud services 110 may include Amazon AWS®, third party APIs, and remote databases. In the example, at least a portion of cloud services 110 may be accessed at URLs app.data or qa.data. In this example, the retrieved set of production environment configuration information is to be used with the web application configuration data (e.g., WAR files) to complete the instantiation of the production application. In some embodiments, the retrieved set of production environment configuration information is stored temporarily (e.g., temporarily stored in memory as opposed to persistently store on disk) with production environment 104 during runtime of the application.

QA environment 112 is managed by users with QA application manager role 114 in manners similar to how QA environment 112 is managed by users with production environment role 104. For example, applications instantiated in QA environment 112 may be implemented as WAR files running inside standard one or more J2EE web containers. In this example, QA environment 112 is accessible at an URL such as www.test.com (i.e., www.test.com is the external access point for that instance of QA environment 112). Users with QA application manager role 114 may instantiate an application in QA environment 112. In various embodiments, users associated with QA application manager role 114 have the required privilege level to perform read-only access to central configuration information management system 106 and the set of QA environment configuration information (but not sets of configuration information specific to environments other than QA) stored thereof. Users with QA application manager role 114 (or any other environment specific application manager roles) are typically different from users with security manager role 108. So, users typically with QA application manger role 114 are only permitted by the identity management system to read the set of QA environment configuration information stored at central configuration information management system 106 but are not permitted to modify the set of configuration information as users with security manager role 108 can. When a user associated with QA application manager role 114 wishes to instantiate an application in QA environment 112 during runtime, the user may submit, over a network (e.g., the Internet), the appropriate credentials, password, and/or any other type of authentication to identify himself to possess QA application manager role 114 to the identity management system and in return, the identity management system will grant the user read-only access to central configuration information management system 106 to obtain the set of QA environment configuration information. The set of QA environment configuration information may include the security keys (e.g., passwords, credentials, authentication information) needed to access internal services or third party services such as cloud services 110 (e.g., which are accessed over a network), and/or topology configuration such as how the application is to access systems (e.g., load balancers, web servers) associated with QA environment 112 externally that are needed to enable the application to run properly. For example, cloud services 110 may include Amazon AWS®, third party APIs, and remote databases. In the example, at least a portion of cloud services 110 may be accessed at URLs app.data or qa.data. In this example, the retrieved set of QA environment configuration information is to be used with the web application configuration data (e.g., WAR files) to complete the instantiation of the QA application. In some embodiments, the retrieved set of QA environment configuration information is stored temporarily (as opposed to persistently) with QA environment 112 during runtime of the application.

By keeping the sets of environment specific configuration information separate from the other configuration data and also managed by different security roles than those primarily associated with managing the specific environments, the sets of environment specific configuration information can be centrally updated by limited users and the updated sets of environment specific configuration information may be managed to being only distributed to specific environments during runtime. Such a system may prevent undesired leaking of security keys across different environments and provide easier management of sets of environment specific configuration information across multiple environments.

Figure 2:
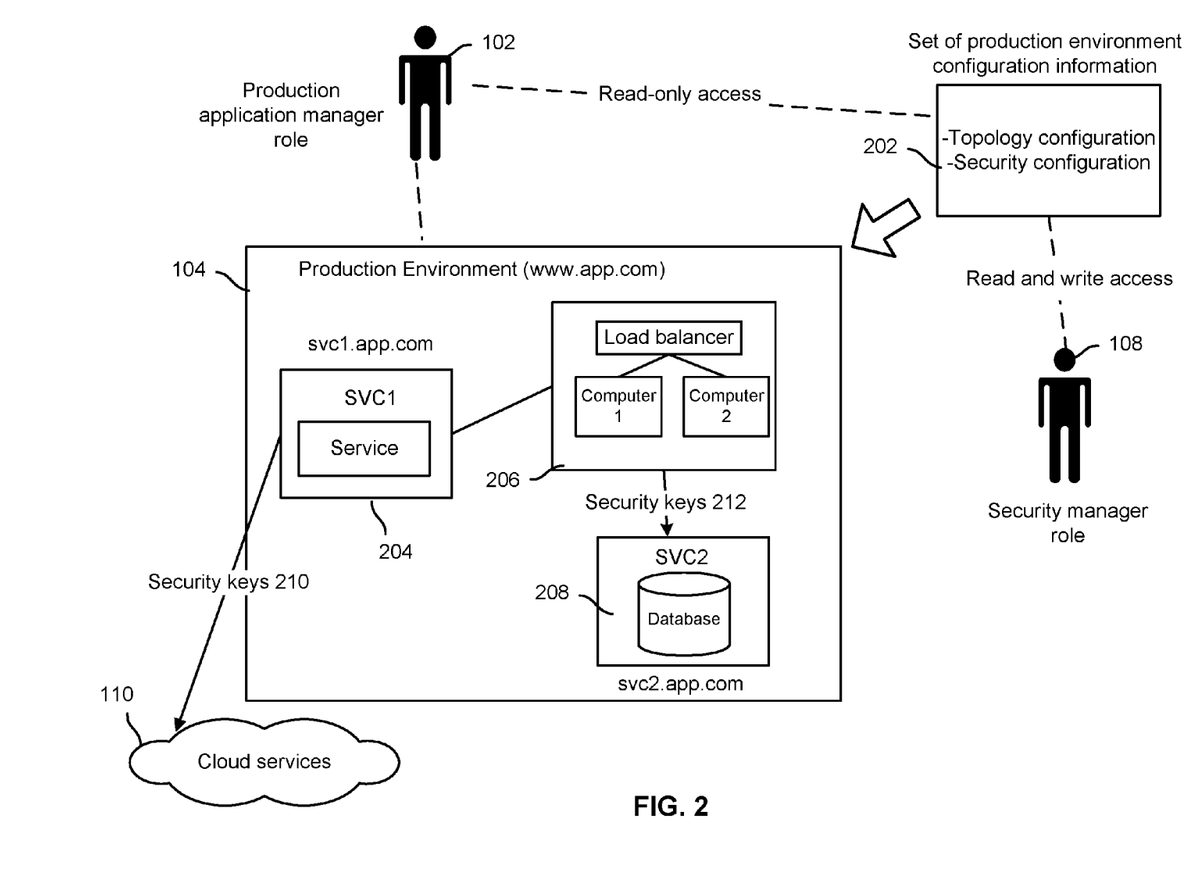
FIG. 2 is a diagram showing an example of instantiating an application in the production environment.

FIG. 2 is a diagram showing an example of instantiating an application in the production environment. An application in production environment 104 of system 100 may be instantiated using the example of FIG. 2. In this example, a user with production application manager role 102 wishes to instantiate an application in production environment 104 and so submits (e.g., over a network) his credentials to an identity management system that protects the central configuration information management system (not shown). Once the identity management system confirms that the credentials submitted by the user are accepted, the user with production application manager role 102 is granted read-only access to the set of configuration information specific to production environment 104 stored at the central configuration information management system, which is set of production environment configuration information 202. Set of production environment configuration information 202 may be defined and/or modified by a user associated with security manager role 108, who is typically not a user associated with production application manager role 102. As shown in the example, set of production environment configuration information 202 includes both topology configuration and security configuration for the production environment. Based on the retrieved set of production environment configuration information 202 in combination with other configuration data that are not necessarily environment specific, the application is instantiated. Other configuration data may come from the WAR files used to implement the application or the same service that provided at least some of the security configuration. Other configuration data may also include constant values for a particular application or per each instance of an application.

In the example, the application is represented by the contents within the box depicted for production environment 104. In the example, the topology configuration of set of production environment configuration information 202 may dictate that the application may be externally accessed at URL www.app.com, should utilize load balancer 206 that distributes workload across two computers (Computer 1 and Computer 2), should use service SVC1 204 comprising the service supported by cloud services 110 at URL svc1.app.com, and should access database service SVC2 206 at URL svc2.app.com (SVC represents "service" and SVC 1 and SVC 2 represent two separate sub-services with different endpoint names). In the example, security configuration of set of production environment configuration information 202 includes security keys 210 to be used to access cloud services for service SVC1 and security keys 212 to be used to access database service SVC2 206. Each of security keys 210 and 212 may comprise a credential, password, and/or other form of authentication. In some embodiments, a copy of set of production environment configuration information 202 is temporarily stored (e.g., in memory) with production environment 104 during the runtime of this application.

Figure 3:
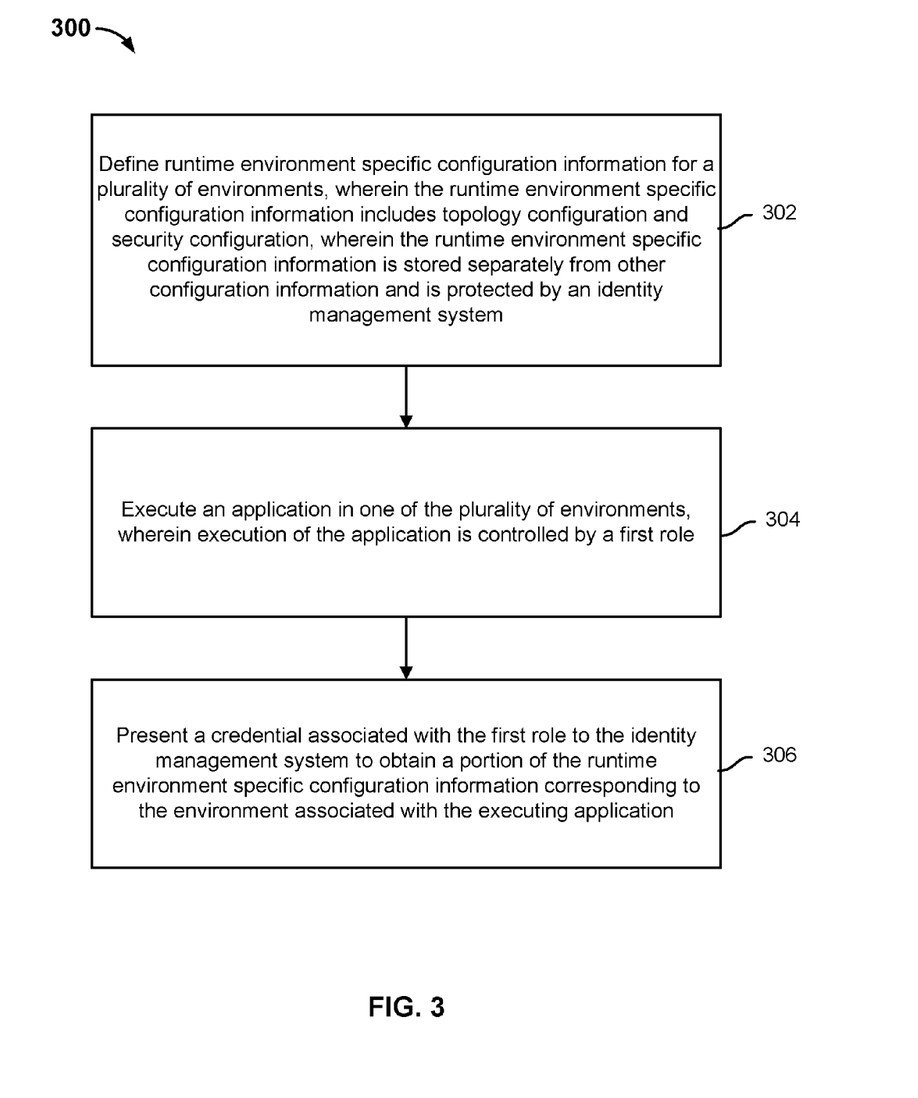
FIG. 3 is a flow diagram showing an embodiment of a process for developing, deploying, and operating an application in a plurality of environments.

FIG. 3 is a flow diagram showing an embodiment of a process for developing, deploying, and operating an application in a plurality of environments. In some embodiments, process 300 may be implemented at system 100.

At 302, runtime environment specific configuration information is defined for a plurality of environments, wherein the runtime environment specific configuration information includes topology configuration and security configuration, wherein the runtime environment specific configuration information is stored separately from other configuration information and is protected by an identity management system. In some embodiments, a set of configuration information is defined for each different type of environment. For example, each set of configuration information may include topology configuration and security configuration for the corresponding environment type. Examples of types of environments include production, development, QA, and clone. The sets of environment specific configuration information are stored separately from other configuration data that is used to instantiate an application in a particular environment. The sets of environment specific configuration information are protected by an identity management system that permits one set of users associated with one type of security role (e.g., an environment specific security role) with privileges to only read one or more of the sets of configuration information and another set of users associated with another type of security role (e.g., security manager role) with privileges to read and also modify one or more of the sets of configuration information. In some embodiments, a user may comprise a human operator or a machine operator (e.g., a computer program). In some embodiments, the privilege level of a security role may be indicated by at least the credentials associated with that role.

At 304, an application in one of the plurality of environments is executed, wherein execution of the application is controlled by a first role. In some embodiments, during runtime, an application is executed in one of the types of environments for which a set of environment specific configuration information was defined. In some embodiments, the application is executed as a result of a user of the first role entering the computer commands and/or making one or more selections at a device associated with executing the application. In some embodiments, this user has a security role that is associated with the environment in which the application is executing.

At 306, a credential associated with the first role is presented to the identity management system to obtain a portion of the runtime environment specific configuration corresponding to the environment associated with the executing application. In some embodiments, credentials (e.g., and/or a password or any other form of authentication) associated with the user's role is presented to the identity management system that protects the sets of environment specific configuration information. In the event that the identity management system authenticates the user, then identity management system will grant the user access to retrieve the set of configuration information associated with the environment in which the application is executing. In some embodiments, a copy of the retrieved set of environment specific configuration information may be stored local to the user and/or the systems on which the application is executing. The application may use environment specific topology configuration and security configuration of the retrieved set of environment specific configuration to receive external communication/traffic and access (via authentication with security keys) to internal components in the deployment.

Figure 4:
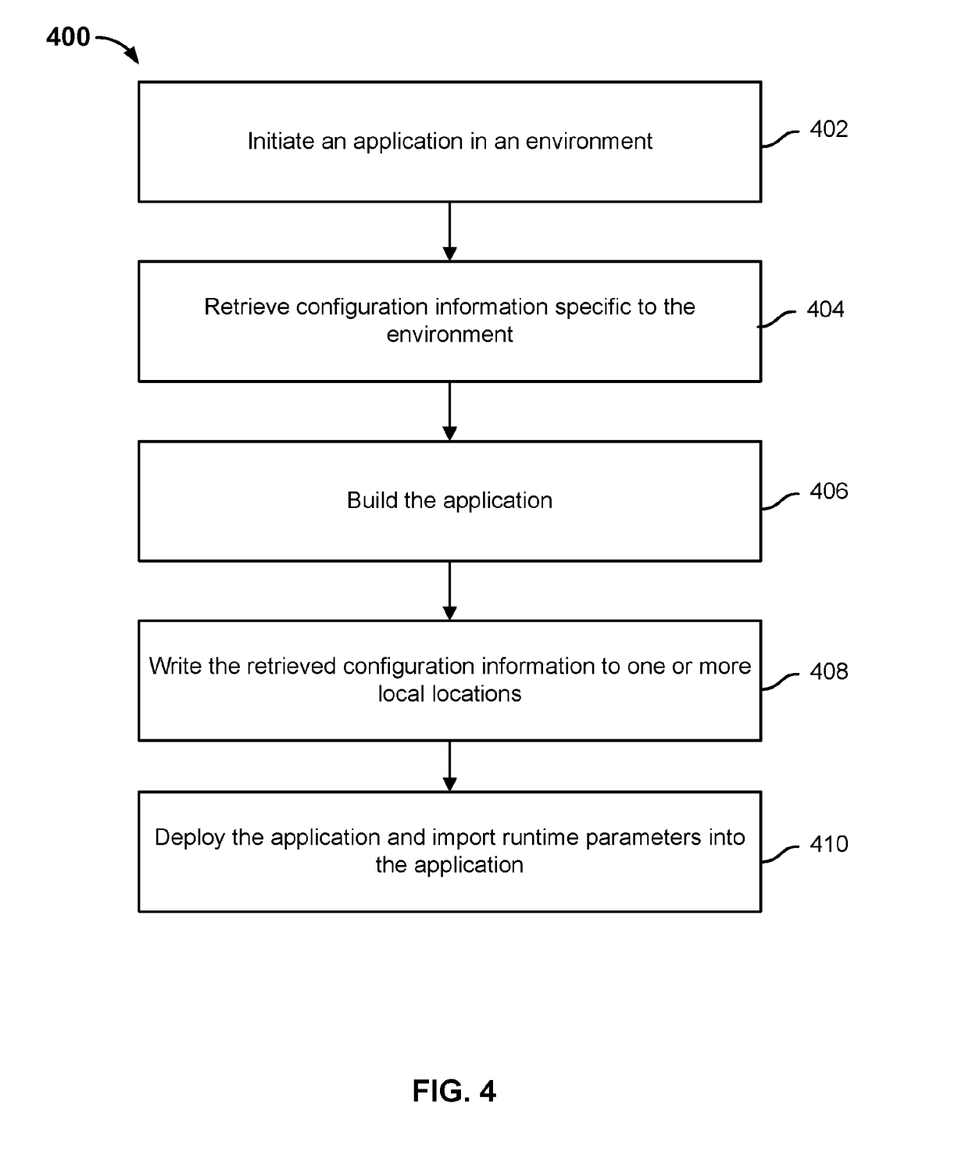
FIG. 4 is a flow diagram showing an example of a process for developing, deploying, and operating an application in one of a plurality of environments.

FIG. 4 is a flow diagram showing an example of a process for developing, deploying, and operating an application in one of a plurality of environments. In some embodiments, process 400 may be implemented at system 100.

In various embodiments, the technologies utilized in process 400 include one or more of the following: Java, J2EE, Apache Maven, Spring Framework; Linux, Windows, Apache Tomcat, Jetty; cloud services (e.g., AWS); domain name server service (DNS SRV) records (for dynamic routing to hosts and dynamic version based routing); DNS wild card suffixes that allow an application to address multiple VIPs to point to the same developer box; configuration system based on Amazon S3®, or local files (or LDAP, etc.).

At 402, an application in an environment is instantiated. In some embodiments, an application is instantiated in a particular type of environment (e.g., production, development, QA) by a user with a security role associated with that type of environment (e.g., production application manager, a development application manager, and a QA application manager). Instantiating the application includes creating an application using any type of appropriate build framework. For example, one can create a web application using Maven, and wire the application-level configuration via Spring Framework.

During runtime, application security keys and logging configuration are loaded (in approximately real-time) from resources outside of the WAR at startup (because security and topology configuration information are not stored with WAR files), where the code bootstrap fetches a URL for runtime configuration. For example, in an embodiment of a development environment, a configuration file location (e.g., file://${project.basedir}/runtimeConfig.properties) is passed in as a parameter for the command that invokes the application. In an embodiment of a production environment, a URL to the configuration parameters (e.g., http://s3.amazon/bucket/prod.env) is passed in as the command line parameter that invokes the application. In each environment, the security role used to launch the application is required to have access privilege to the configuration URL in order to successfully read and process the configurations. Built-in access control (e.g., an identity management system) (such as file system access control, S3 control, or AWS access control) can be used for controlling access to the environment specific configuration information. Further, since the underlying JAVA code for processing the configurations can process file protocol and HTTP protocol transparently, no if/else is required for configuration processing based on different environments.

At 404, configuration information specific to the environment is retrieved. In some embodiments, the configuration information (including topology configuration and security configuration) specific to the environment is retrieved from a location different than where other configuration data is stored. In some embodiments, the configuration information specific to the environment is stored with configuration information specific to one or more different environments at a central configuration information management system that is protected by an identity management system. The identity management system can ensure that only those with the right level of privileges can access the environment specific configuration information, so as to prevent leaking of sensitive information such as security key to users without the required privilege level/credentials. In this example, the user that launched the application during runtime may submit credentials to the identity management system to access the appropriate configuration information specific to the environment. If the user becomes authenticated at the identity management system, the identity management system grants the user access to retrieve the appropriate configuration information specific to the environment.

In this example, each set of environment specific configuration information is stored in a "runtimeConfig.properties" file. In some embodiments, the configuration service that pulls the set of configuration information specific to the environment defined in the "runtimeConfig.properties" understands where/how to pull the configuration for the application for the specific environment.

In order to support multiple environments and individualized environments for developers, in some embodiments, the above "runtimeConfig.properties" needs to be parameterized. Parameterizing a "runtimeConfig.properties" file includes, in some embodiments, to have a filter run across a template file so that the file is correct for a particular environment. If Maven build system is used, this file can be filtered with different maven profiles (for example, different profiles for different environments such as QA, development, production, etc.) by replacing the parameters in the file to generate the final property file for runtime to use for a particular environment.

The following is an example runtimeConfig.properties file storing security and topology configuration information for a particular environment:
Security Key Configuration for AWS Simpledb and Domain Definition:
com.vendio.simpledb.aws.accessKey=*****
com.vendio.simpledb.aws.secretKey=*****
com.vendio.simpledb.userDomain=
someDomainDev${runtimeconfig.simpleDB.suffix}
Security Key Configuration for Facebook API Calls:
com.vendio.facebook.appID=****
com.vendio.facebook.appSecret=****
Topology Configuration to Access some Cache:
com.vendio.endPoint=<some hostname>
com.vendio.port=<some port>

In this example, sensitive information such as security keys and environment specific information such as topology configuration may be configured differently for different environments.

In some embodiments, the production environment runtime configuration file is handled differently than at least one of the runtime configuration files for another type of environment. Since the file contains the security keys and production topology wiring data, it may be given extra protection and therefore access to it may be restricted to fewer users with greater access privilege levels such as, for example, users associated with the security manager role.

At 406, the application is built. If the approach described above where the appropriate environment specific runtimeConfig.properties file is retrieved is followed, the application built with the retrieved configuration information and other configuration data would be generic and contain little if any condition execution statements (e.g., if/else statements) in its startup/configuration portion.

At 408, the retrieved configuration information is written to one or more local locations. For management purposes, in some embodiments, the retrieved runtimeConfig.properties file is stored temporarily to one or more local locations so that it may be read locally for an environment with many defaults. In some other embodiments, the retrieved runtimeConfig.properties file is not stored locally but rather, the file is retrieved from the central configuration information management system each time that it is needed by the application.

At 410, the application is deployed and runtime parameters are imported into the application. The application is deployed, and in some embodiments, the template runtimeConfig.properties file is filtered (depending on mode), to be correct for the particular environment. This is to say that the application will then have the proper runtime configuration data once started. It will understand how to talk to each other component that is participated in the same deployment. The security on keys in the runtimeConfig.properties file and other configuration data for application component may be used to access protected sources, such as Facebook® APIs, database access information, etc.

The techniques described above support providing runtime configuration information for various types of environments (e.g., production, QA, development) and also supports separating security roles for users who may access and modify sets of environment specific configuration information and also users who may only access (but not modify) the sets of configuration information (e.g., during the execution of an application in a particular type of environment).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an instruction to execute an application in a selected environment type of a plurality of environment types, wherein the instruction is issued by a role, wherein the instruction comprises a parameter associated with a location identifier associated with a portion of runtime environment specific configuration information corresponding to the selected environment type, wherein the portion of runtime environment specific configuration information corresponding to the selected environment type comprises security configuration corresponding to the selected environment type;
in response to the instruction, presenting a credential associated with the role to an identity management system;
in response to the identity management system accepting the credential associated with the role, obtaining the portion of the runtime environment specific configuration information corresponding to the selected environment type; and
executing, using one or more processors, the application in the selected environment type based at least in part on the obtained portion of the runtime environment specific configuration information corresponding to the selected environment type, including by using one or more security keys included in the security configuration corresponding to the selected environment type to access one or more protected sources.

2. The method of claim 1, further comprising defining the runtime environment specific configuration information to be associated with the plurality of environment types, wherein the runtime environment specific configuration information includes for each environment type corresponding topology configuration and the security configuration corresponding to the selected environment type.

3. The method of claim 1, wherein the plurality of environment types includes one or more of the following: a production environment, a quality assurance (QA) environment, a clone environment, and a development environment.

4. The method of claim 1, wherein the portion of the runtime environment specific configuration information corresponding to the selected environment type comprises topology information associated with the selected environment type.

5. The method of claim 1, wherein the portion of the runtime environment specific configuration information corresponding to the selected environment type comprises topology information associated with the selected environment type, wherein the topology information comprises one or more of configuration data usable to access systems associated with an environment externally and configuration data usable to access components in a deployment internally.

6. The method of claim 1, wherein the one or more protected sources include a protected data source and a protected application programming interface (API).

7. The method of claim 1, further comprising storing the obtained portion of the runtime environment specific configuration information corresponding to the selected environment type locally.

8. The method of claim 1, further comprising storing the obtained portion of the runtime environment specific configuration information corresponding to the selected environment type temporarily.

9. The method of claim 1, wherein the credential indicates a privilege level associated with the role.

10. A computer program product, the computer program product being embodied in a non-transitory computer readable storage medium and comprising computer executable instructions, which, when implemented by a processor, cause a computer to perform the steps of:
receiving an instruction to execute an application in a selected environment type of a plurality of environment types, wherein the instruction is issued by a role, wherein the instruction comprises a parameter associated with a location identifier associated with a portion of runtime environment specific configuration information corresponding to the selected environment type, wherein the portion of runtime environment specific configuration information corresponding to the selected environment type comprises security configuration corresponding to the selected environment type;
in response to the instruction, presenting a credential associated with the role to an identity management system;
in response to the identity management system accepting the credential associated with the role, obtaining the portion of the runtime environment specific configuration information corresponding to the selected environment type; and
executing the application in the selected environment type based at least in part on the obtained portion of the runtime environment specific configuration information corresponding to the selected environment type, including by using one or more security keys included in the security configuration corresponding to the selected environment type to access one or more protected sources.

11. The computer program product of claim 10, further comprising defining the runtime environment specific configuration information to be associated with the plurality of environment types, wherein the runtime environment specific configuration information includes for each environment type corresponding topology configuration and the security configuration corresponding to the selected environment type.

12. The computer program product of claim 10, wherein the plurality of environment types includes one or more of the following: a production environment, a quality assurance (QA) environment, a clone environment, and a development environment.

13. The computer program product of claim 10, wherein the portion of the runtime environment specific configuration information corresponding to the selected environment type comprises topology information associated with the selected environment type.

14. The computer program product of claim 10, wherein the portion of the runtime environment specific configuration information corresponding to the selected environment type comprises topology information associated with the selected environment type, wherein the topology information comprises one or more of configuration data usable to access systems associated with an environment externally and configuration data usable to access components in a deployment internally.

15. The computer program product of claim 10, wherein the one or more protected sources include a protected data source and a protected application programming interface (API).

16. A system, comprising:
one or more processors configured to:
receive an instruction to execute an application in a selected environment type of a plurality of environment types, wherein the instruction is issued by a role, wherein the instruction comprises a parameter associated with a location identifier associated with a portion of runtime environment specific configuration information corresponding to the selected environment type, wherein the portion of runtime environment specific configuration information corresponding to the selected environment type comprises security configuration corresponding to the selected environment type;
in response to the instruction, present a credential associated with the role to an identity management system;
in response to the identity management system accepting the credential associated with the role, obtain the portion of the runtime environment specific configuration information corresponding to the selected environment type; and
execute the application in the selected environment type based at least in part on the obtained portion of the runtime environment specific configuration information corresponding to the selected environment type, including by using one or more security keys included in the security configuration corresponding to the selected environment type to access one or more protected sources; and
one or more memories coupled to the one or more processors and configured to provide the one or more processors with instructions.

17. The system of claim 16, wherein the portion of the runtime environment specific configuration information corresponding to the selected environment type comprises topology information associated with the selected environment type.

* * * * *